United States Patent
Tsai et al.

(10) Patent No.: US 10,365,999 B2
(45) Date of Patent: Jul. 30, 2019

(54) METHOD AND APPARATUS FOR PERFORMING MEMORY SPACE RESERVATION AND MANAGEMENT

(71) Applicant: Synology Incorporated, Taipei (TW)

(72) Inventors: Chuan-Yu Tsai, Taipei (TW); Yi-Chun Lin, Taipei (TW)

(73) Assignee: SYNOLOGY INCORPORATED, Taipei (TW)

( * ) Notice: Subject to any disclaimer, the term of this patent is extended or adjusted under 35 U.S.C. 154(b) by 11 days.

(21) Appl. No.: 15/811,698

(22) Filed: Nov. 14, 2017

(65) Prior Publication Data

US 2018/0293162 A1  Oct. 11, 2018

(30) Foreign Application Priority Data

Apr. 6, 2017 (CN) .......................... 2017 1 0221668

(51) Int. Cl.
*G06F 12/02* (2006.01)
*G06F 9/455* (2018.01)
*G06F 3/06* (2006.01)

(52) U.S. Cl.
CPC ............ *G06F 12/023* (2013.01); *G06F 3/065* (2013.01); *G06F 3/068* (2013.01); *G06F 3/0619* (2013.01); *G06F 3/0653* (2013.01); *G06F 9/45558* (2013.01); *G06F 2009/45583* (2013.01); *G06F 2212/1044* (2013.01); *G06F 2212/657* (2013.01)

(58) Field of Classification Search
CPC combination set(s) only.
See application file for complete search history.

(56) References Cited

U.S. PATENT DOCUMENTS

2011/0153977 A1* 6/2011 Root ................... G06F 12/0223
711/171
2015/0149742 A1* 5/2015 Richter ............... G06F 12/1009
711/206

* cited by examiner

*Primary Examiner* — Yong J Choe
(74) *Attorney, Agent, or Firm* — McClure, Qualey & Rodack, LLP

(57) ABSTRACT

A method and an apparatus for performing memory space reservation and management are provided, wherein the method is applied to a server system. The method includes: providing a mount point at a file system of a server in the server system, and creating a file at the mount point to occupy partial memory space of a physical memory; mapping the file to a section of virtual memory addresses to prevent any swap operation from being applied to the partial memory space; and updating file information of the file into a memory space management list to dynamically manage the partial memory space.

20 Claims, 12 Drawing Sheets

METHOD AND APPARATUS FOR PERFORMING MEMORY SPACE RESERVATION AND MANAGEMENT

BACKGROUND OF THE INVENTION

1. Field of the Invention

The present invention relates to a memory management, and more particularly, to a method and an apparatus for performing memory space reservation and management.

2. Description of the Related Art

When a target process is required to be executed in a computer system with a heavy loading, the problem of lacking memory space might happen. Some methods have been proposed in the related art to try to reserve the memory space for the target process. However, the methods cannot promise that the problem can be solved without introducing any side effect. For example, a first method of the methods suggests executing a dummy process to occupy the required memory space in the computer system. Before executing the target process, the dummy process needs to be stopped to release the memory space to the operating system, which allows other processes to occupy the released memory space before the target process starts running. As the released memory space is occupied, the target process still cannot get the memory space for running. Therefore, a novel method and an associated architecture are desired to make sure there is enough memory space for executing the target process without introducing any unwanted side effect.

SUMMARY OF THE INVENTION

One of the objectives of the present invention is to provide a method and an apparatus for performing memory space reservation and management, to solve the problems mentioned above.

Another object of the present invention is to provide a method and an apparatus for performing memory space reservation and management to make sure there is enough memory space for executing a target process without introducing any unwanted side effect.

At least one embodiment of the present invention discloses a method for performing memory space reservation and management, and the method can be applied to a server system. The method includes: providing a mount point at a file system of a server in the server system through a predetermined command, and creating a file at the mount point to occupy partial memory space of a physical memory; mapping the file to a section of virtual memory addresses to prevent any swap operation from being applied to the partial memory space; and updating file information of the file into a memory space management list, to dynamically manage the partial memory space.

At least one embodiment of the present invention discloses an apparatus for performing memory space reservation and management, and the apparatus can be applied to a server system. The apparatus includes: a processing circuit, positioned in a server in the server system, wherein the processing circuit is arranged to control operations of the server system. For example, the processing circuit can perform the following operations: providing a mount point at a file system of the server in the server system through a predetermined command, and creating a file at the mount point to occupy partial memory space of a physical memory; mapping the file to a section of virtual memory addresses to prevent any swap operation from being applied to the partial memory space; and updating file information of the file into a memory space management list, to dynamically manage the partial memory space.

One of the advantages of the present invention is, in comparison with the related art, the method and the apparatus of the present invention can enhance the reliability of the server system. In addition, the method and the apparatus of the present invention can make sure there is enough memory space for executing a target process without introducing any unwanted side effect.

These and other objectives of the present invention will no doubt become obvious to those of ordinary skill in the art after reading the following detailed description of the preferred embodiment that is illustrated in the various figures and drawings.

DETAILED DESCRIPTION

One or more embodiments of the present invention disclose a method and an apparatus for performing memory space reservation and management, both of which can be applied to a server system including one or more servers. Examples of the one or more servers may include, but are not limited to: Network Attached Storage (NAS) servers. The aforementioned method for performing memory space reservation and management (hereinafter the method) and the aforementioned apparatus for performing memory space reservation and management (hereinafter the apparatus) can make sure there is enough memory space for executing a target process without introducing any unwanted side effect.

The apparatus may include at least one portion (e.g. a portion or all) of any server in the server system. More particularly, the apparatus may include a processing circuit in the server, wherein the processing circuit can control operations of the server system, such as operations of the server, according to the method, to provide a memory reservation mechanism to guarantee that the server can smoothly execute the target process when needed. Examples of the target process may include, but are not limited to: a virtual machine (VM) process (hereinafter VM process), a storage system managing process, a certain process executed by a backup server, and a certain process executed by a scheduling system at a specific time point. The server implemented according to the method and the apparatus can obtain memory block (s) that the target process needs from a physical memory in advance when there is enough memory space, and make the memory block(s) stay in the physical memory rather than being swapped out. In this way, the target process can use the memory block (s) directly every time when the target process is executed. In addition, the Memory block (s) can be released when the need no longer exists.

Figure 1:
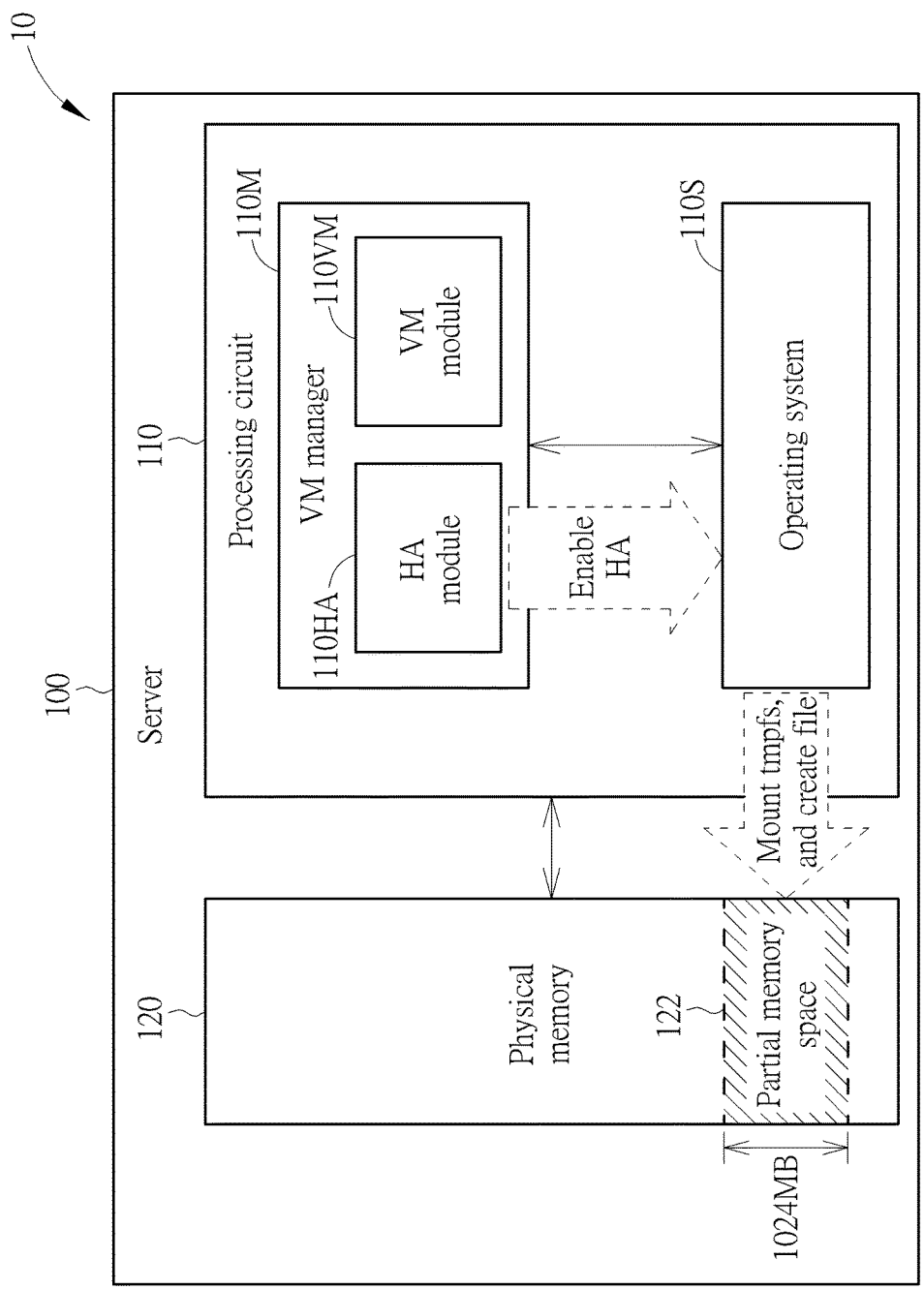
FIG. 1 is a diagram of a server system according to an embodiment of the present invention.

FIG. 1 is a diagram of a server system 10 according to an embodiment of the present invention. The server system 10 can be taken as an example of the aforementioned server system, where a server 100 can be taken as an example of the aforementioned server, a processing circuit 110 can be taken as an example of the aforementioned processing circuit, and a physical memory 120 can be taken as an example of the aforementioned physical memory. The server 100 may include the processing circuit 110, the physical memory 120 and related circuits (e.g. bus, control chipset, etc.), and may further include one or more storage devices (not shown in FIG. 1), such as one or more hard disk drives (HDDs) and/or one or more solid state drives (SSDs). According to this embodiment, the processing circuit 110 may include at least one processor such as a Central Processing Unit (CPU). The physical memory 120 may be a Random Access Memory (RAM). In addition, the processing circuit 110 can execute one or more program modules corresponding to the method to facilitate the memory space reservation and management for the target process, and the physical memory 120 and the one or more storage devices are arranged to store information. As shown in FIG. 1, a virtual machine manager (VM manager) 110M of the processing circuit 110 may include a high availability module (HA module) 110HA and a virtual machine module (VM module) 110VM. The HA module 110HA and the VM module 110VM can be program modules running on the aforementioned at least one processor. For example, the VM manager 110M (and the HA module 110HA and the VM module 110VM therein) can run in the environment of an operating system 110S of the server 100.

According to this embodiment, the VM module 110VM can create a plurality of VMs on the server 100 for providing services to a plurality of users, respectively, manage the plurality of VMs, and delete one or more VMs of the plurality of VMs. The VM module 110VM is in charge of the start-up management of the plurality of VM (e.g. performing the start-up parameter setting of the plurality of VMs) and the location selection management of the plurality of VMs (e.g. controlling any of the plurality of VMs to start up at a selected physical machine). When creating one of the plurality of VMs, the VM module 110VM may try to assign a set of hardware resource (e.g. the CPU, the memory, the network and the size of the storage space obtained from the one or more storage devices) in the server 100 to the VM. The VM module 110VM can successfully assign the set of hard resource to the VM to allow the VM to be smoothly started up, as long as there in enough memory space in the physical memory 120 and other hardware resource in the server 100 can fit the VM's needs. For example, the VM process may include an operating system of the VM, wherein the operating system seen by the user of the VM is the operating system of the VM, rather than the operating system 110S of the server 100. In addition, the server system 10 can be equipped with a high availability function (HA function). When a user (e.g. the system custodian) of the server system 10 enables the HA function, the HA module 110HA can perform one or more operations regarding HA (marked as "Enable HA" in FIG. 1). The HA module 110HA can store an HA plan indicating: which VM(s) require backup; and which physical machine(s) should be used as the backup server.

For example, the one or more servers may include a plurality of servers, wherein any two of the plurality of servers can communicate with each other via network(s). Based on at least one replacement/rotation or backup mechanism, one of the plurality of servers may play a role of a startup server, and another one of the plurality of servers may play a role of a backup server. When the start-up server is not able to operate normally (for example, due to damage or power failure), the backup server can replace the start-up server automatically. For better comprehension, assume that the server 100 plays the role of the backup server. The processing circuit 110 (e.g. the VM manager 110M or the HA module 110HA therein) can provide a mount point (e.g. a tmpfs mount point) at a file system of the operating system 110S through a predetermined command, and create at least one file at the mount point to occupy partial memory space 122 of the physical memory 120, such as the memory block(s). The timing for executing the predetermined command can be changeable. For example, before the HA function is enabled, the processing 110 can execute the predetermined command in advance to provide the mount point at the file system of the operating system 110S. In addition, the timing for creating the aforementioned at least one file at the mount point is changeable. For example, when the HA function is enabled, the processing circuit 110 can trigger the operation of creating the aforementioned at least one file at the mount point to occupy the partial memory space 122.

The mount point may correspond to a certain directory (or folder) in a file system of the server 100, such as a directory "/tmpfs/mpool", wherein the processing circuit 110 can create the directory "/tmpfs/mpool" in the file system in advance. According to this embodiment, the predetermined command may include a command "mount" of Unix-like operating system(s) and the related parameters. For example, the HA module 110HA can execute the following command and parameters in the environment of the operating system 110S: mount -t tmpfs tmpfs/tmpfs/mpool wherein the parameters "tmpfs /tmpfs/mpool" indicate that the mount operation can mount "tmpfs" at the directory "/tmpfs/mpool", and the parameters "-t tmpfs" indicate that the corresponding type is "tmpfs" (which is expected to be presented like mounting file system(s), but the data is usually stored in a volatile memory such as RAM). For another example, the HA module 110HA can execute the following command and parameters in the environment of the operating system 110S: mount -t tmpfs -o size=7G tmpfs /tmpfs/mpool wherein the parameters "-o size=7G" indicate that the directory "/tmpfs/mpool" can use the memory space having the size of (7 * $2^{30}$) bytes in RAM. For brevity, the mounting operation is marked as "Mount tmpfs" in FIG. 1. In addition, the HA module 110HA can create a file having a predetermined size (e.g. $2^{30}$ bytes; which is marked as "1024 MB" in FIG. 1) in the directory "/tmpfs/mpool" to occupy the partial memory space 122.

When the server 100 plays the role of the backup server, the processing circuit 110 (e.g. the VM manager 110M) can reserve enough memory space, e.g. the partial memory space 122, in the physical memory 120 for the VM in advance to make sure the VM can start up smoothly when needed, without being hindered by any problem of insufficient memory space. In this way, when the start-up server is not able to operate normally (for example, due to damage or power failure), the backup server can replace the start-up server automatically and the VM can transfer to the backup server to operate smoothly.

Figure 2:
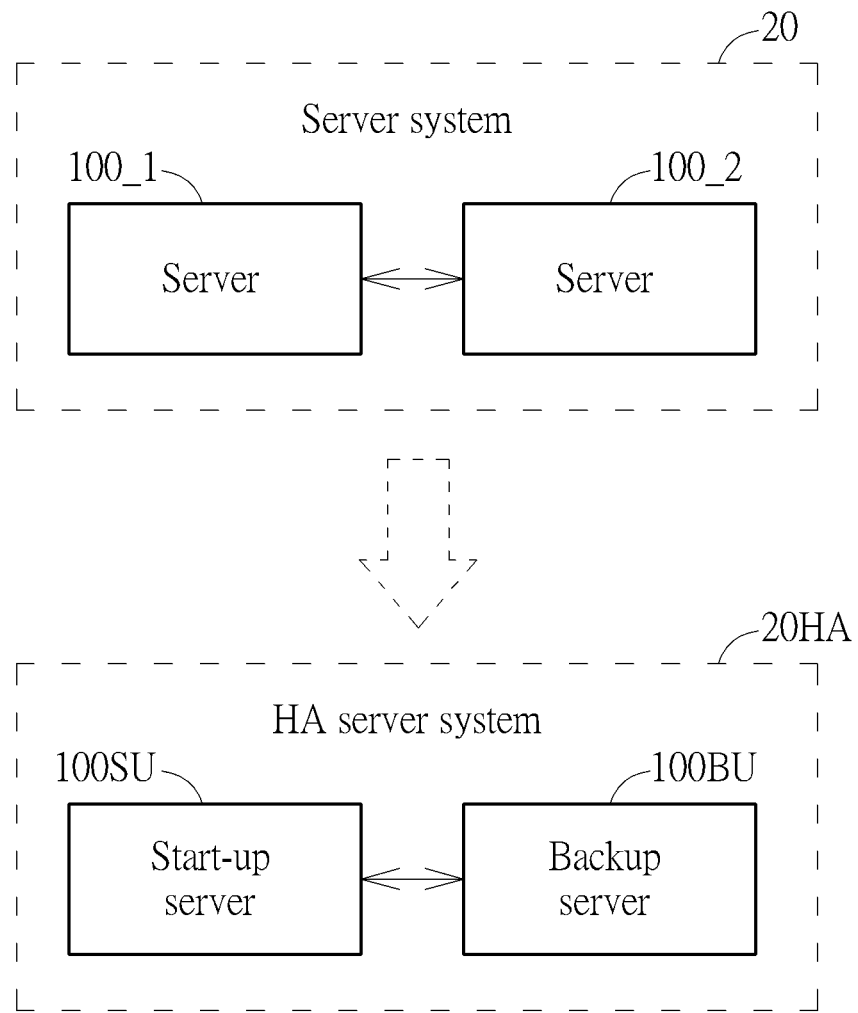
FIG. 2 illustrates a high availability configuration of the server system shown in FIG. 1 according to an embodiment of the present invention.

FIG. 2 illustrates a HA configuration of the server system 10 shown in FIG. 1 according to an embodiment of the present invention. The server system 20 may include a plurality of servers such as servers 100_1 and 100_2, wherein the server system 20 can be taken as an example of the server system 10, and the serves 100_1 and 100_2 can be taken as examples of the plurality of servers. To make sure the service provided by the server system 20 will not stop, the server system 20 can be configured to be a HA server system 20HA. For example, when the HA function is enabled, one of the servers 100 1 and 100 2 (more particularly, the processing circuit therein) can provide a user interface to allow a user of the server system 20 to assign the servers 100_1 and 100_2 to be the start-up server 100SU and the backup server 100BU respectively. The VM can operate in the start-up server 100SU when booting up, and the VM can operate in the backup server 100BU in a backup status. This backup mechanism is not limited to single VM. For example, the start-up server 100SU can execute a plurality of VM processes, and the plurality of VM processes can represent the plurality of VMs, wherein each of the plurality of VM processes can be a storage system management process. The plurality of VM processes can provide the storage system management services to the plurality of users respectively, and the plurality of users can use their host computers to access the HA server system 20HA via network connections, respectively. For the plurality of users, the plurality of VM processes make the server system 20HA look like a plurality of server systems corresponding to (e.g. belonging to) the plurality of users respectively.

Based on the method, when the server system 20 is configured to be the HA server system 20HA, the server 100BU (e.g. the processing circuit therein) can obtain a plurality of memory blocks that the plurality of VMs need, respectively, from the physical memory (e.g. RAM) in the server 100BU in advance when there is enough memory space, and make the plurality of memory blocks stay in the physical memory, rather than being swapped out. In this way, the server 100BU allows the plurality of VM processes to use the plurality of memory blocks respectively every time when they operate in the server 100BU, and when the needs corresponding to one or more users (e.g. the needs of running one or more VMs for the one or more users) no longer exist, the server 100BU can release one or more corresponding memory blocks of the plurality of memory blocks. When the start-up server 100SU is not able to normally operate (for example, due to damage or power failure), the backup server 100BU can replace the start-up server automatically to continue the service since, based on the method, the server 100BU can also prepare memory blocks in advance in a similar manner. In this situation, as the memory blocks in the server 100BU are ready, the plurality of VM processes can operate in the server 100BU smoothly. Assume a certain user of the plurality of users does not need the HA server system 20HA. In this situation, the server 100BU can cancel the authority of the user according to the command from the user or the system custodian, and can release a corresponding memory block of the memory blocks.

Figure 3:
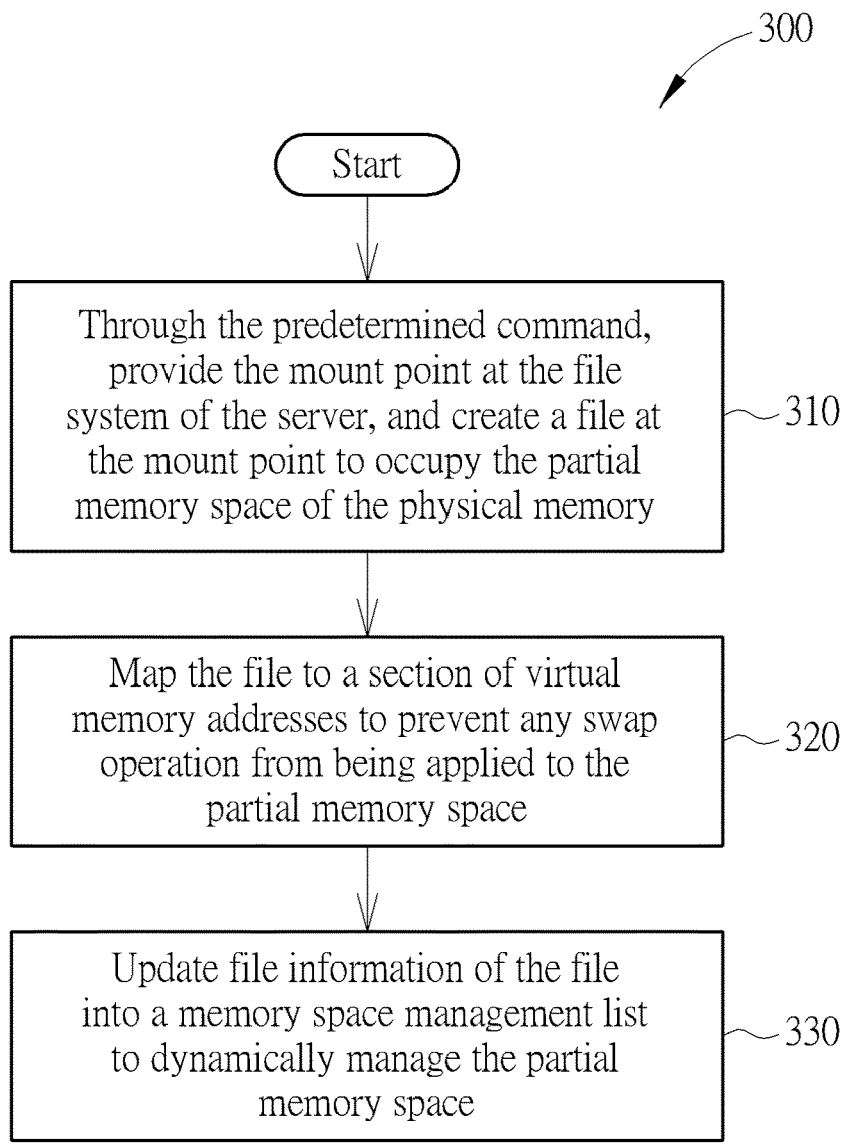
FIG. 3 illustrates a flowchart of a method for performing memory space reservation and management according to an embodiment of the present invention.

FIG. 3 illustrates a flowchart of a method 300 for performing memory space reservation and management according to an embodiment of the present invention. The aforementioned method, e.g. the method 300 shown in FIG. 3, can be applied to the server system 10 and the server 100 shown in FIG. 1, and also to the processing circuit 110 therein.

In step 310, through the predetermined command (such as the command "mount"), the processing circuit 110 can provide the mount point at the file system of the server 100 (i.e. the file system of the aforementioned operating system 110S), and create a file at the mount point to occupy the partial memory space 122 of the physical memory 120. The mount point may correspond to a predetermined directory of the file system, such as the directory "/tmpfs/mpool". Please note that, the real storage location of any file created at the mount point is within the physical memory 120, rather than any HDD or SSD. In addition, the file name of the file can be generated by encoding, to allow the processing circuit 110 to use the memory space directly according to the encoded file name.

In step 320, the processing circuit 110 can map the file to a section of virtual memory addresses to prevent any swap operation from being applied to the partial memory space 122. For example, the processing circuit 110 can map the file to the section of virtual memory addresses through another command (e.g. a command "mmap" of the Unix-like operating system(s)) to generate a mapping relationship between the file and the section of virtual memory addresses, wherein the mapping relationship allows the implementation of accessing the file by accessing the section of virtual memory addresses.

In step 330, the processing circuit 110 can update file information of the file into a memory space management list to dynamically manage the partial memory space 122. For example, according to at least one monitoring result of the predetermined directory, such as one or more monitoring results, the processing circuit 110 can update the memory space management list.

According to this embodiment, the processing circuit 110 can reserve the partial memory space 122 for the target process. When the target process starts to operate (e.g., triggered by the users, the backup mechanism, or the scheduling system), it can use the partial memory space 122. No matter how many times the target process will be executed, the processing circuit 110 can reserve the partial memory space 122 for the target process until the need of using the partial memory space 122 no longer exists (e.g. the target process no longer needs to be executed). The memory space reservation and management mechanism are not limited to single target process. For example, the server 100 can execute a plurality of target processes (e.g. the plurality of VM processes, a plurality of storage system management processes, a plurality of processes executed by the backup server, and/or a plurality of processes executed by the scheduling system at different time points respectively), and the processing circuit 110 can monitor the predetermined directory to perform memory space reservation and management in regard to the plurality of target processes.

The aforementioned at least one monitoring result may include a first monitoring result which can be regarded as a monitoring result regarding memory space reservation. At a certain moment, the processing circuit 110 can monitor the predetermined directory to determine whether any file belonging to a predetermined type, e.g. a file of "tmpfs" type, exists in the predetermined directory, to generate the first monitoring result. For example, the file belongs to the predetermined type. When the first monitoring result indicates that the file belonging to the predetermined type exists in the predetermined directory, the processing circuit 110 triggers the operation of step 320.

In addition, the aforementioned at least one monitoring result may include a second monitoring result which can be regarded as the monitoring result regarding memory space release. At another moment, the processing circuit 110 may monitor the predetermined directory to determine whether the file belonging to the predetermined type exists in the predetermined directory, to generate the second monitoring result. When the memory space management list indicates that the file is mapped onto the section of virtual memory addresses, and the second monitoring result indicates that the file belonging to the predetermined type does not exist in the predetermined directory, the processing circuit 110 may unmap the file from the section of virtual memory addresses, and remove the file information of the file from the memory space management list, to dynamically manage the partial memory space 122. For example, the processing circuit 110 may unmap the file from the section of virtual memory addresses through yet another command (e.g. a command "munmap" of the Unix-like operating system) to cancel the mapping relationship between the file and the section of virtual memory addresses.

Furthermore, the file information may include the file name of the file. In step 330, the processing circuit 110 (e.g. a program module running on the processor, such as a daemon process 110D in the following embodiments) can update a set of mapping information corresponding to the file into the memory space management list to dynamically manage the partial memory space 122, wherein the set of mapping information may include the file information and the section of virtual memory space. Please note that the file information is not limited to the file name. For example, the set of mapping information may include the file name, the section of virtual memory addresses for mapping, the size of the file, or any of various combinations of the above three items.

Figure 4:
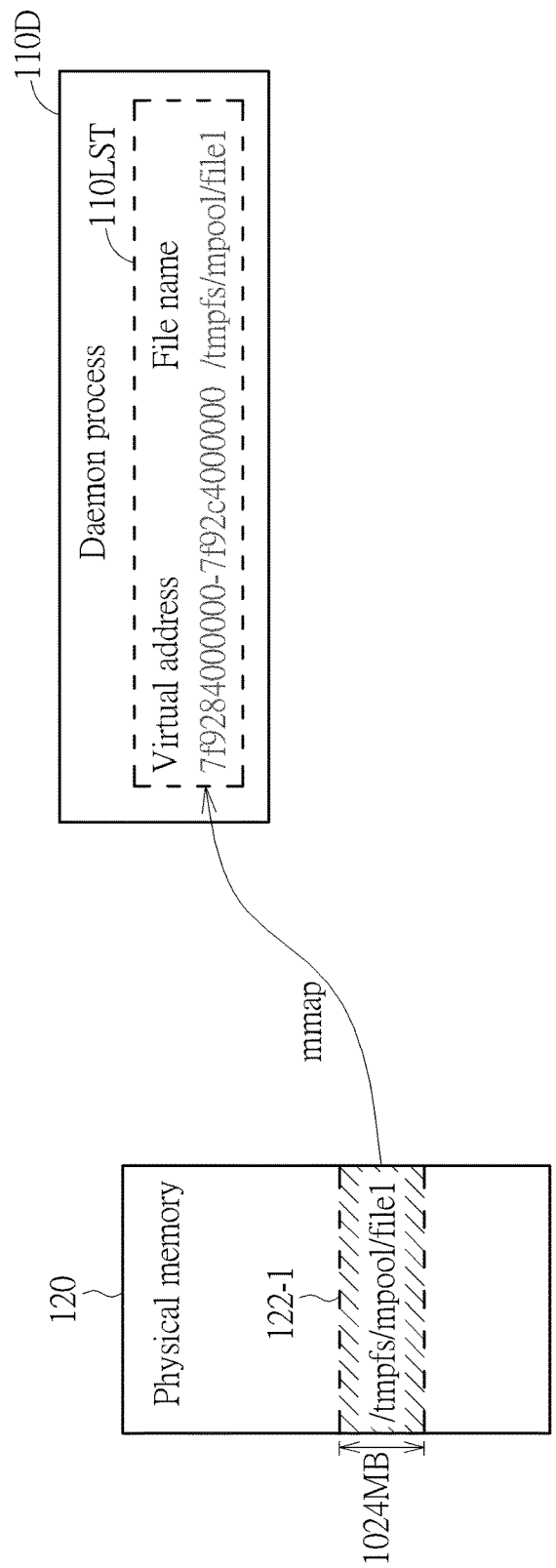
FIG. 4 illustrates a memory space reservation scheme of the method shown in FIG. 3 according to an embodiment of the present invention.

FIG. 4 illustrates a memory space reservation scheme of the method 300 shown in FIG. 3 according to an embodiment of the present invention. The partial memory space 122-1 can be taken as an example of the partial memory space 122, the file file1 can be taken as an example of the file occupying the partial memory space 122, and the memory space management list 110LST can be an example of the memory space management list mentioned in step 330, wherein the virtual addresses 7f92840000-7f92c4000000 (represented in hexadecimal) can be taken as an example of the section of virtual memory addresses. The file name may include a base name such as "file1". For easy access, the file name may further include directory or path, such as "/tmpfs/mpool". For example, the file name of the file can be "/tmpfs/mpool/file1". Please note that, based on different types of systems and different designs, the file name is changeable. In addition, the predetermined directory (e.g. the directory "/tmpfs/mpool") can be regarded as a memory reservation pool, and the daemon process 110D can be regarded as a memory reservation management daemon.

A plurality of program modules in the processing circuit 110 can communicate with each other via an inter-process communication (IPC) to operate cooperatively. The VM manager 110M can create or delete the file in the predetermined directory, and inform the daemon process 110D of the change of the memory reservation pool to trigger the daemon process 110D to perform a synchronization handling. An example of the operation of the synchronization handling may include, but are not limited to: in response to the first monitoring result, mapping the file to the section of virtual memory addresses, and updating the file information of the file into the memory space management list 110LST; and in response to the second monitoring result, unmapping the file from the section of virtual memory addresses, and removing the file information of the file from the memory space management list 110LST. The daemon process 100D may list all files in the memory reservation pool and their sizes to compare them with the current content of the memory space management list. If there is any file that has not been synchronized, for example, the file1 exists in the memory reservation pool, but there is no mapping information of the file1 in the memory space management list 110LST, then the daemon process 100D may use the command "mmap" together with the parameter MAP_LOCKED to map the file1 to its own (the file1's) virtual address space, such as the virtual addresses 7f92840000-7f92c4000000, to make sure the file1 will be completely reserved in the physical memory 120, and update the set of mapping information (e.g. the file name "/tmpfs/mpool/file1" and the virtual addresses 7f92840000-7f92c4000000) into the memory space management list 110LST. The partial memory space 122-1 can be reserved for the target process such as the VM. For better comprehension, the file name "/tmpfs/mpool/file1" is marked in the partial memory space 122-1.

Figure 5:
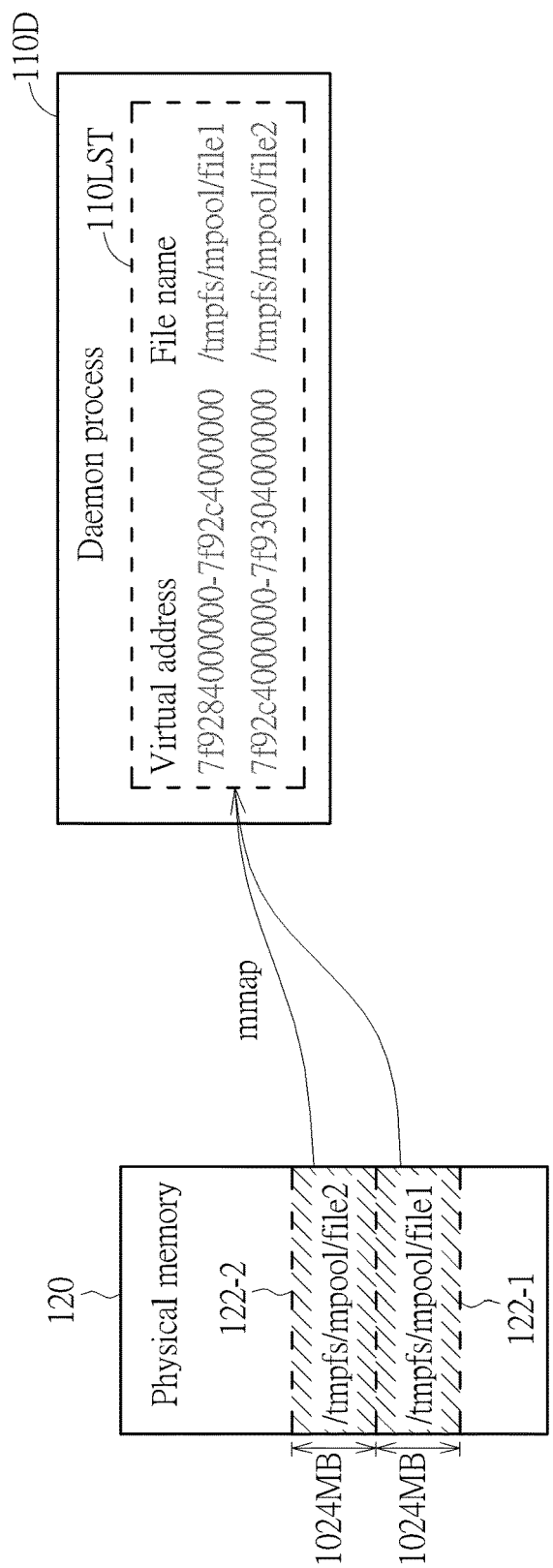
FIG. 5 illustrates some related details of the memory space reservation scheme shown in FIG. 4 according to an embodiment of the present invention.

FIG. 5 illustrates some related details of the memory space reservation scheme shown in FIG. 4 according to an embodiment of the present invention. The partial memory space 122-2 can be taken as another example of the partial memory space 122, and the file file2 (whose file name can be "/tmpfs/mpool/files2") can be taken as another example of the file occupying the partial memory space 122, wherein the virtual addresses 7f92c4000000-7f9304000000 (represented in hexadecimal) can be taken as another example of the section of virtual memory addresses. According to this embodiment, the processing circuit 110 may perform similar operations upon the file2. For example, these operations may include: creating the file2 at the mount point to occupy the partial memory space 122-2 in the physical memory 120; mapping the fil2 to another section of virtual memory addresses, such as the virtual addresses 7f92c4000000-7f9304000000, to prevent any swap operation from being applied to the partial memory space 122-2; and update file information of the file2 (e.g. the file name "/tmpfs/mpool/file2") into the memory space management list 100LST to dynamically manage the partial memory space 122-2.

Similarly, the VM manager 100M can create or delete the file2 in the predetermined directory, and inform the daemon process 100D of the change of the memory reservation pool to trigger the daemon process 110D to perform the synchronization handling. If there is any file that has not been synchronized, for example, the file2 exists in the memory reservation pool, but there is no mapping information of the file2 in the memory space management list 110LST, then the daemon process 100D may use the command "mmap" together with the parameter MAP LOCKED to map the file2 to its own (the file2's) virtual address space, such as the virtual addresses 7f92c4000000-7f9304000000, to make sure the file2 will be completely reserved in the physical memory 120, and update a corresponding set of mapping information (e.g. the file name "/tmpfs/mpool/file2" and the virtual addresses 7f92c4000000-7f9304000000) into the memory space management list 110LST. The partial memory space 122-2 can be reserved for another target process of the plurality of target processes, such as another VM of the plurality of VMs. For better comprehension, the file name "/tmpfs/mpool/file2" is marked in the partial memory space 122-2.

According to some embodiments, the processing circuit 110 (e.g. a certain program module executed on the processor, such as the VM manager 110M or the HA module 110HA or the VM module 110VM therein) may determine the file name of the file (e.g. the file name "/tmpfs/mpool/file1", the file name "/tmpfs/mpool/file2", etc.) according to a predetermined filename coding rule. According to some embodiments, the predetermined file name coding rule may correspond to a VM name coding rule. For example, the VMs having VM names "VMA", "VMB", "VMC", "VMD", etc. may use the files having file names "/tmpfs/mpool/fileA", "/tmpfs/mpool/fileB", "/tmpfs/mpool/fileC", "/tmpfs/mpool/fileD", etc., respectively. For another example, the VMs having VM names "VM1", "VM2", etc. may use the files having file names "/tmpfs/mpool/file1", "/tmpfs/mpool/file2", etc., respectively. According to some embodiments, the predetermined file name coding rule may be implemented as one or more predetermined look-up tables which can be stored in the server 100 (e.g. the physical memory 120 or the one or more storage devices). According to some embodiments, the operating system 110S may determine the section of virtual memory addresses (e.g. the virtual addresses 7f9284000000-7f92c4000000, the virtual addresses 7f92c4000000-7f9304000000, etc.)

Figure 6:
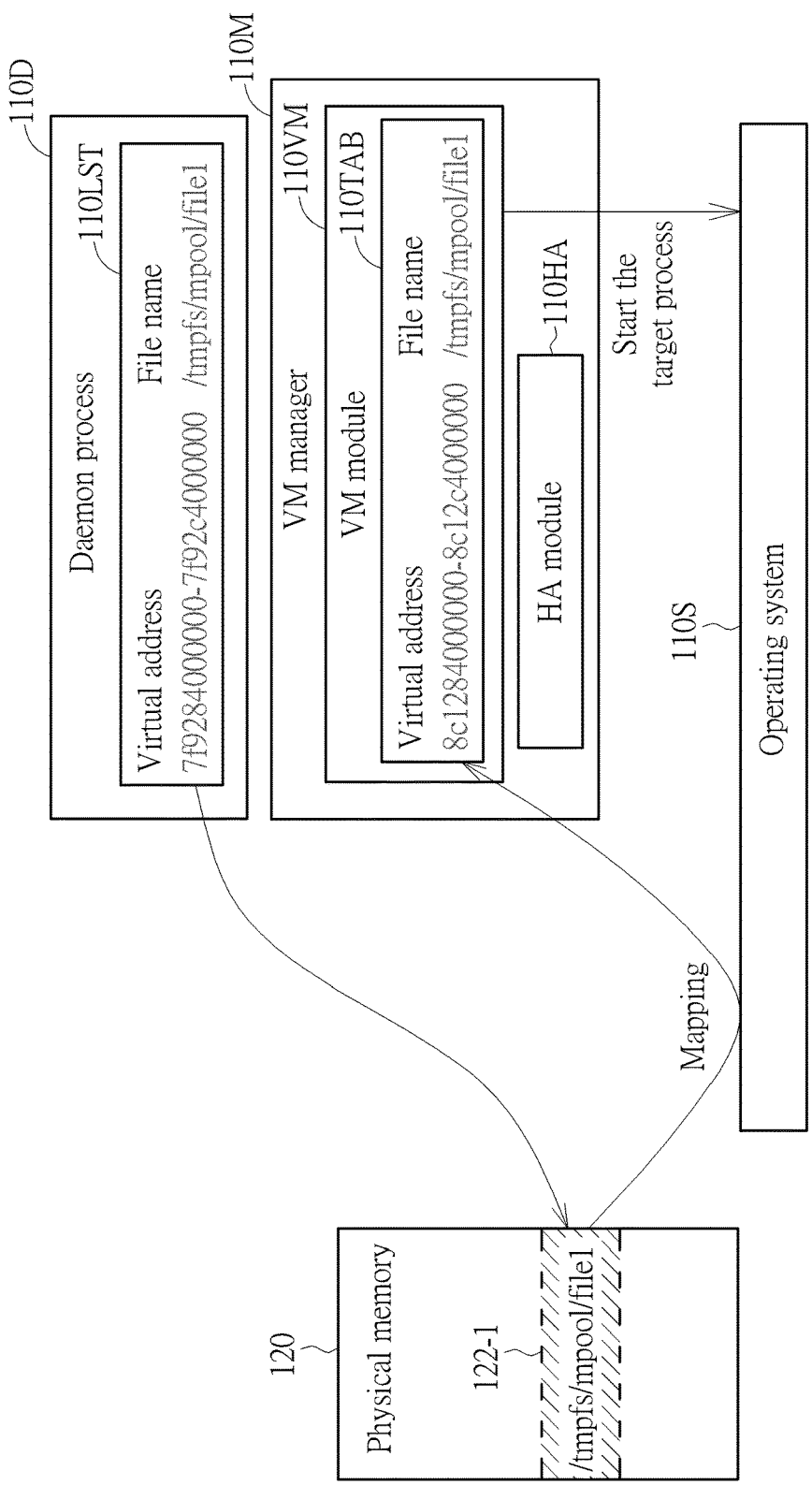
FIG. 6 illustrates a mapping control scheme of the method shown in FIG. 3 according to an embodiment of the present invention.

FIG. 6 illustrates a mapping control scheme of the method 300 shown in FIG. 3 according to an embodiment of the present invention. An information table 110TAB may include the related parameters for launching the target process (e.g. the VM), such as one or more characteristics of the target process (e.g. the VM name "VM1"; and a scheduled routine time for the target process, an unique identification (UID), etc.) and the file name "/tmpfs/mpool/file1", to indicate another mapping relationship (marked as "Mapping" in FIG. 6), i.e. the mapping relationship between the file file1 in the physical memory 120 and the VM VM1. In this way, when the target process (e.g. the VM VM1) starts up or boots up, the VM module 110VM may select and use the file file1 that is reserved in advance, to make sure the target process can obtain the memory space that it needs. Based on the information table 110TAB, the processing circuit 110 (e.g. the VM module 110VM) controls the target process to directly use the partial memory space 122-1, and the target process (e.g. the VM VM1) does not need to allocate the memory by itself. In this way, the target process can be executed more than once, and when the target process is closed, the processing circuit 110 can still reserve the partial memory space 122-1 for next time usage, such as the next execution of the target process.

According to this embodiment, the server system 10 may be equipped with VM function, and the VM running on the server system 10 can be arranged to control a portion of operations of the server system 10. When the VM is created (e.g. the VM module 110VM launches the VM), the processing circuit 110 may map the file1 to virtual addresses 8c1284000000-8c12c4000000 of the VM. According to some embodiments, the other VM running on the server system 10 can be arranged to control another portion of operations of the server system 10. When the other VM is created (e.g. the VM module 110VM launches the other VM), the processing circuit 110 may map the file file2 to virtual addresses of the other VM.

According to some embodiments, the scheduled routine time may include a series of predetermined time, and the predetermined file name coding rule may corresponds to a target process name coding rule (e.g. the VM name coding rule). Based on the relationship between the predetermined file name coding rule and the target process name coding rule, the VM module 110VM or the target process may know which file should be selected for use of executing the target process. In this way, according to the one or more characteristics of the target process, the processing circuit 110 (e.g. the VM module 110VM or the target process) may select the file (e.g. the file file1) in the physical memory 120 for the target process.

Figure 7:
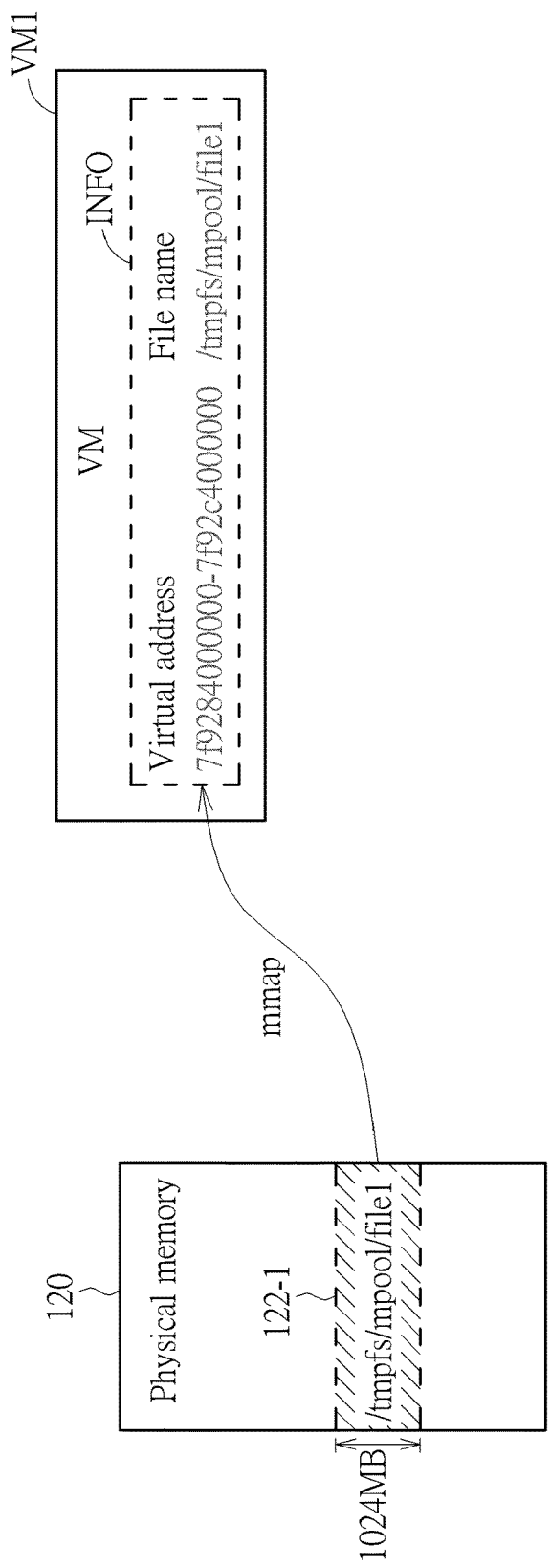
FIG. 7 illustrates a mapping control scheme of the method shown in FIG. 3 according to another embodiment of the present invention.

FIG. 7 illustrates a mapping control scheme of the method 300 shown in FIG. 3 according to another embodiment of the present invention, wherein the VM1 can be taken as an example of the VM. According to this embodiment, in a situation where the HA function has not been enabled, the processing circuit 110 (e.g. the VM module 110VM) may launch the target process such as the VM VM1. Assume the information table 110TAB includes the one or more characteristics of the target process (e.g. the name of the VM, such as "VM1") and the file name "/tmpfs/mpool/file1", in which the VM VM1 may obtain the information INFO from the VM module 110VM. The processing circuit 110 (e.g. the VM module 110VM or the VM VM1) may create a file of "tmpfs type", such as the file file1, in the file system 110S, and map the file file1 to virtual memory space of the VM VM1, such as the virtual addresses 7f9284000000-7f92c4000000.

Figure 8:
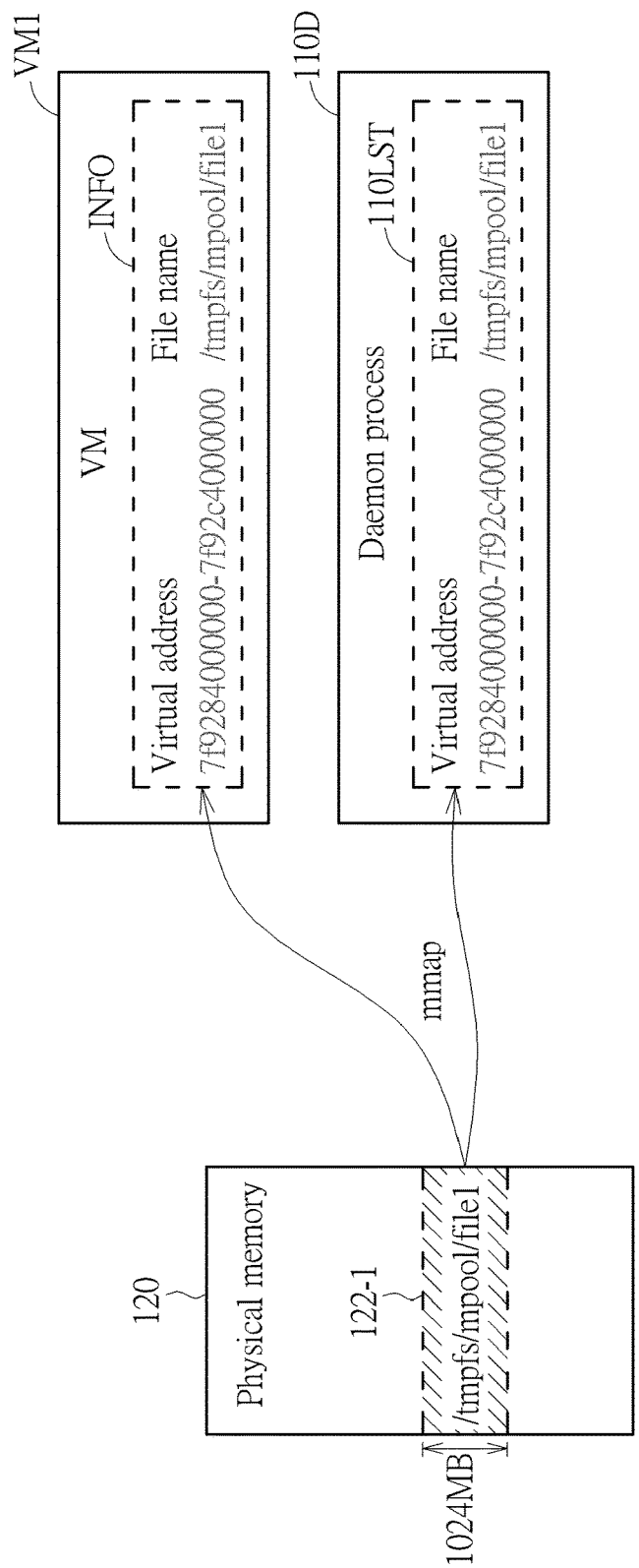
FIG. 8 illustrates some related details of the mapping control scheme shown in FIG. 7 according to an embodiment of the present invention.

FIG. 8 illustrates some related details of the mapping control scheme shown in FIG. 7 according to an embodiment of the present invention. After these operations mentioned above, when the user enables the HA function, the daemon process 110D may perform the synchronization handling to map the file file1 to its own (the daemon process 110D's) virtual addresses 7f9284000000-7f92c4000000, and update the file name "/tmpfs/mpool/file1", the virtual addresses 7f9284000000-7f92c4000000, and the size of the file into the memory space management list 110LST.

Figure 9:
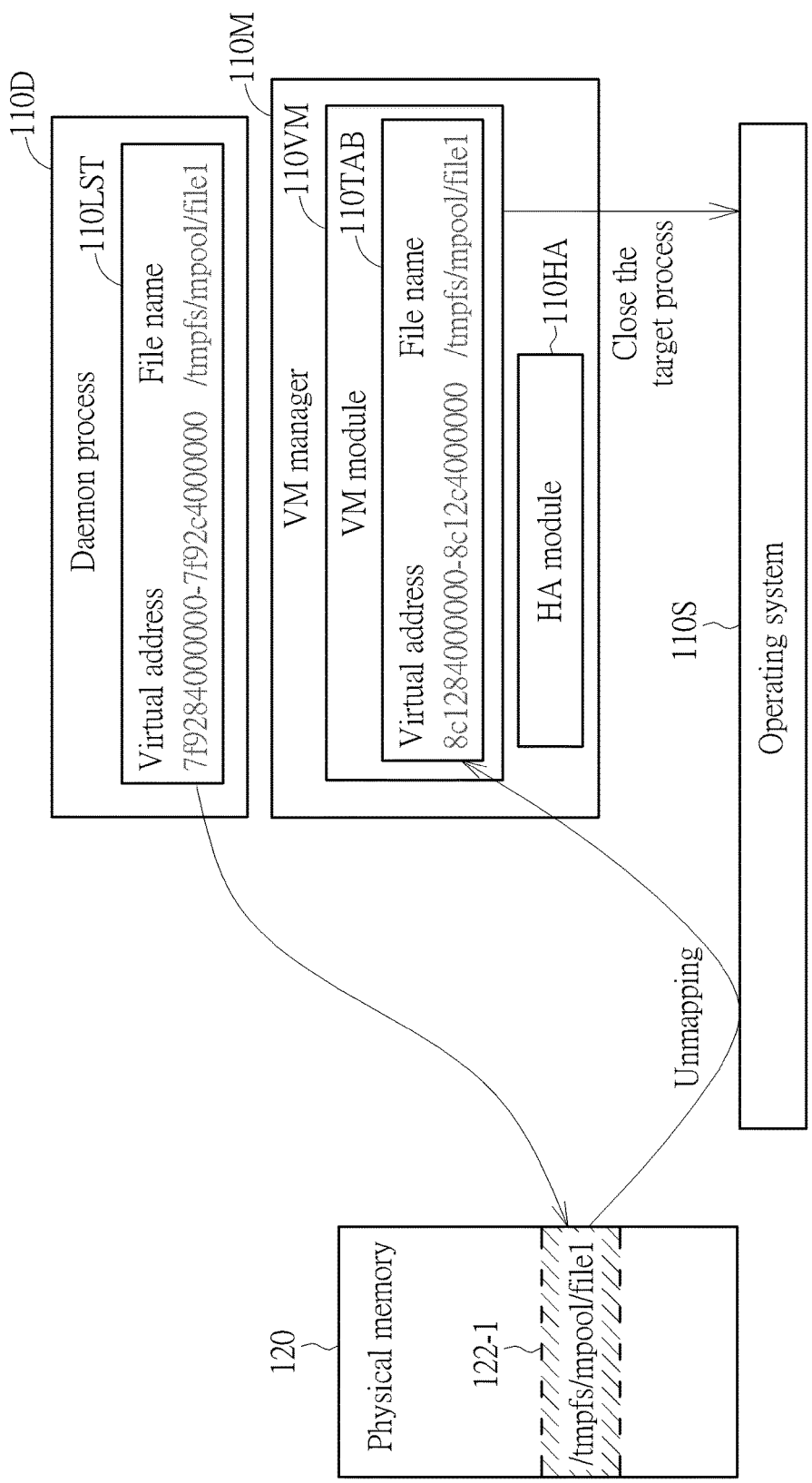
FIG. 9 illustrates an unmapping control scheme of the method shown in FIG. 3 according to an embodiment of the present invention.

FIG. 9 illustrates an unmapping control scheme of the method 300 shown in FIG. 3 according to an embodiment of the present invention. The processing circuit 110 (e.g. the VM module 110VM) may close the target process such as the VM. After the target process stops running, the file file1 and the virtual memory addresses 8c1284000000-8c12c4000000 are in an unmapping status (marked as "Unmapping" in FIG. 9), and the partial memory space 122-1 is still reserved for the target process, rather than being used or taken away by other process(es). As shown in FIG. 9, the daemon process 110D still maintains the original mapping relationship, such as the mapping relationship between the file file1 and the virtual addresses 7f9284000000-7f92c4000000. Therefore, after the target process such as the VM stops running, the partial memory space 122-1 can still be reserved for the target process, as long as the HA function is not disabled. Next time, when the target process is executed, the processing circuit 110 may repeat the series of operations regarding mapping, such as the operations of the mapping control scheme shown in FIG. 6, to allow the target process to directly use the partial memory space 122-1.

Figure 10:
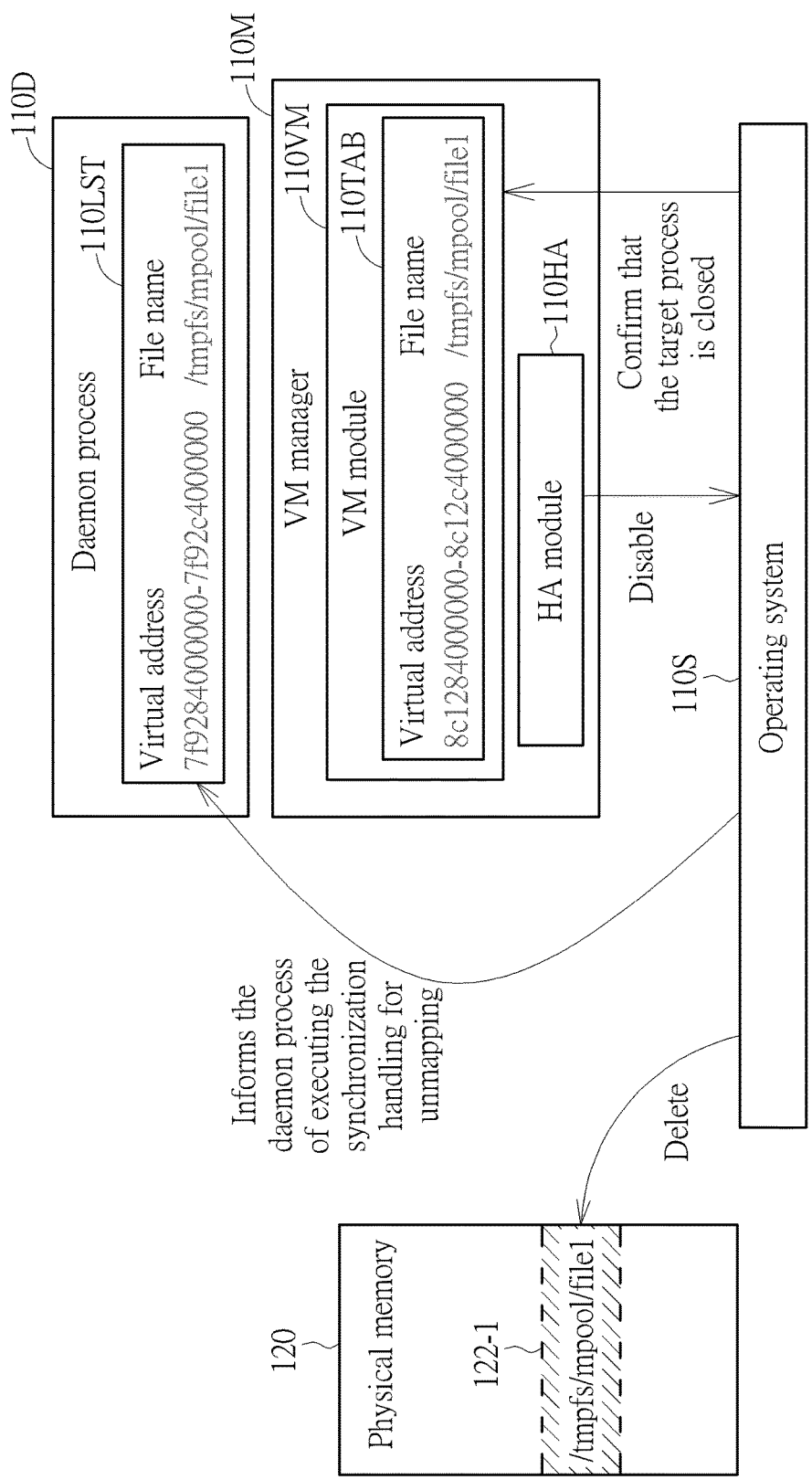
FIG. 10 illustrates a memory space release control scheme of the method shown in FIG. 3 according to an embodiment of the present invention.

FIG. 10 illustrates a memory space release control scheme of the method 300 shown in FIG. 3 according to an embodiment of the present invention. When the need of reserving the partial memory space 122-1 no longer exists, the processing circuit 110 (e.g. the VM manager 110M) may release the partial memory space 122-1 through the following operations: first, the VM module 110VM confirms that the target process is closed (e.g. the VM module 110VM may check whether the VM shuts down, and execute the next operation after confirming the VM normally shuts down); the HA module 110HA (in the environment of the operating system 110S) deletes the corresponding file in the memory reservation pool, such as the file file1; and the HA module 110HA informs the daemon process 110D of executing the synchronization handling for unmapping, wherein the inform operation may trigger the daemon process 110D to execute the synchronization handling for unmapping.

According to this embodiment, when the user disables the HA function, the HA module 110HA may perform some operations regarding disabling the HA function when the VM module 110VM confirms that the target process is closed (marked as "Disable" in FIG. 10). For example, the HA module 110HA may delete the file file1 in the memory reservation pool (which means reserving the partial memory space 122-1 is no longer needed), and inform the daemon process 110D of executing the synchronization handling. If there is a file that has not been synchronized, for example, the file file1 does not exist in the memory reservation pool, but there is the mapping information of the file file1 in the memory space management list 110LST, then the daemon process 100D may use the command "munmap" to unmap the file file1 from the virtual addresses 7f9284000000-7f92c4000000 to release the partial memory space 122-1 to the operating system 110S.

Based on the memory space release control scheme, when there is no need to use the partial memory space 122 such as the partial memory space 122-1, the processing circuit 110 may delete the file directly, unmap the file from the section of virtual memory addresses, and remove the file information of the file from the memory space management list to dynamically manage the memory space 122.

Figure 11:
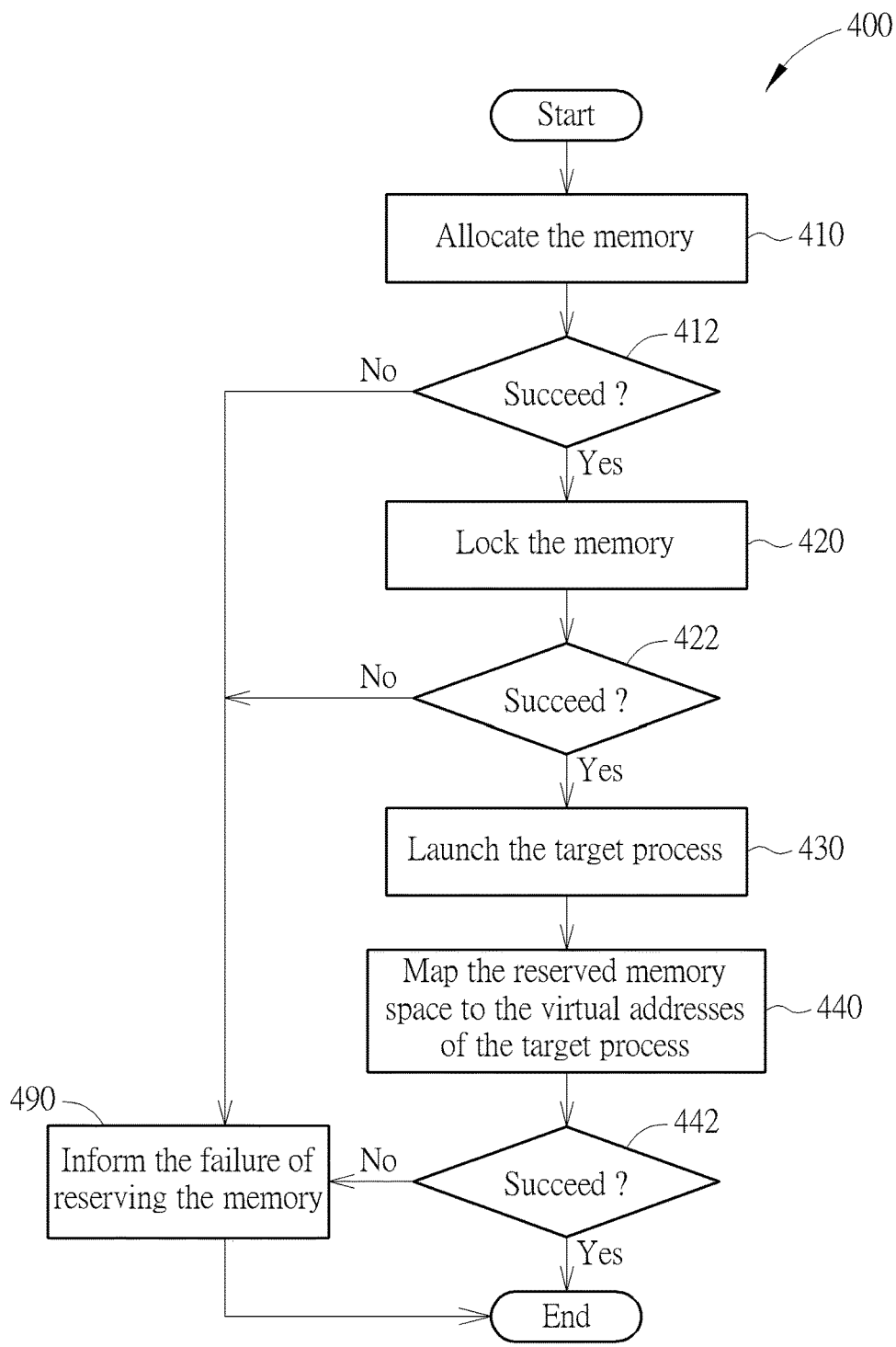
FIG. 11 illustrates a working flow of the method shown in FIG. 3 according to an embodiment of the present invention.

FIG. 11 illustrates a working flow 400 of the method 300 shown in FIG. 3 according to an embodiment of the present invention.

In step 410, the processing may allocate the memory. For example, the processing circuit 110 may create the file at the mount point to occupy the partial memory space 122.

In step 412, the processing circuit 110 may check whether the allocating operation is successful. When the allocating operation is successful, step 420 is entered; otherwise, step 490 is entered.

In step 420, the processing circuit 110 may lock the memory. For example, the processing circuit 110 may map the file to the section of virtual memory addresses to prevent any swap operation from being applied to the partial memory space 122.

In step 422, the processing circuit 110 may check whether the locking operating is successful. When the locking operation is successful, step 430 is entered; otherwise, step 490 is entered.

In step 430, the processing circuit 110 may launch the target process, e.g. the VM process.

In step 440, the processing circuit 110 may map the reserved memory space (e.g. the partial memory space 122) to the virtual addresses of the target process.

In step 442, the processing circuit 110 may check whether the mapping operating is successful. When the mapping operation is successful, the working flow comes to the end; otherwise, step 490 is entered.

In step 490, the processing circuit 110 may inform the user of the failure of reserving the memory. For example, the processing circuit 110 may inform the user by outputting or displaying an error message.

Figure 12:
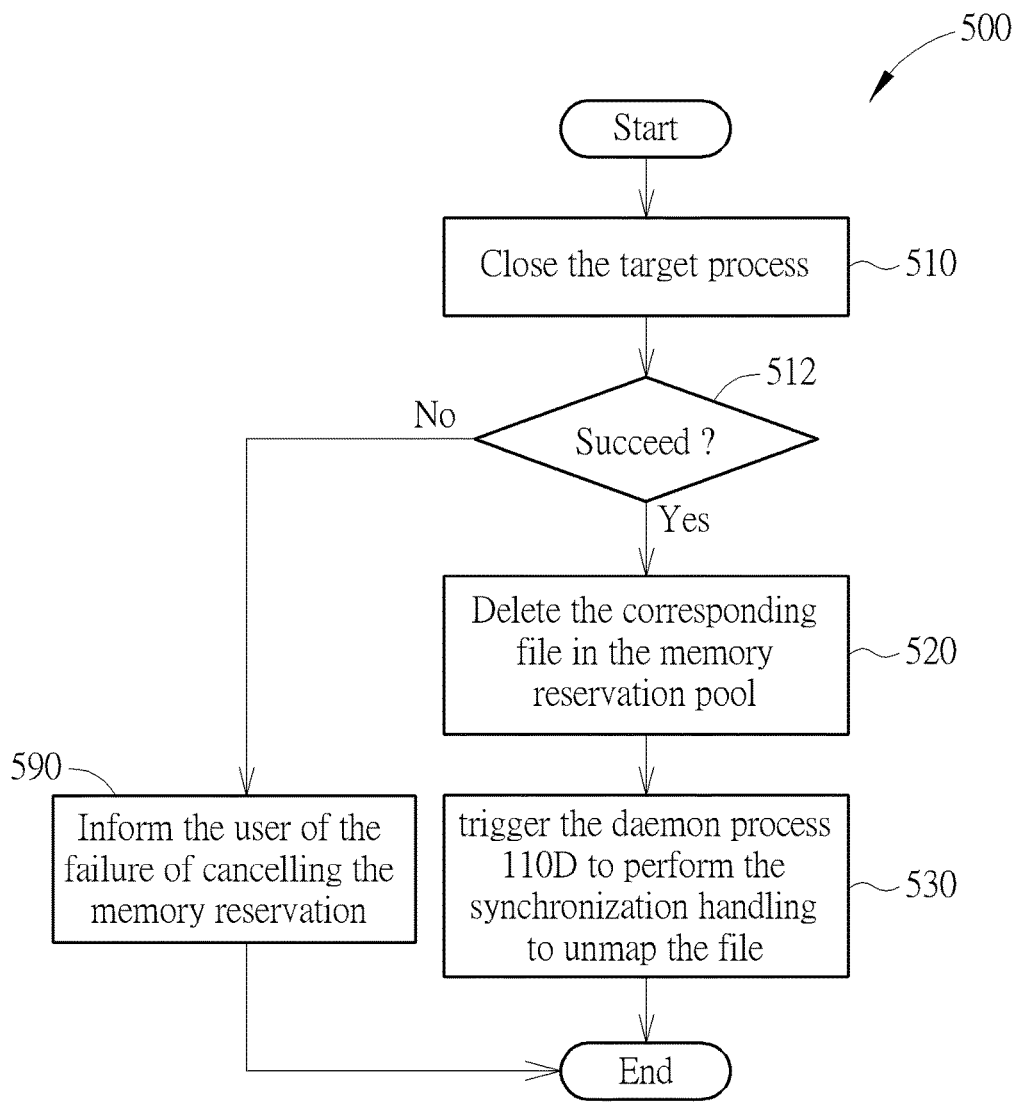
FIG. 12 illustrates a working flow of the method shown in FIG. 3 according to another embodiment of the present invention.

FIG. 12 illustrates a working flow 500 of the method 300 shown in FIG. 3 according to another embodiment of the present invention.

In step 510, the processing circuit 110 may close the target process such as the VM process. For example, the process circuit 110 may perform the close operation in response to a shutdown command from the user.

In step 512, the processing circuit 110 may check whether the close operation is successful. When the close operation is successful, step 520 is entered; otherwise, step 590 is entered.

In step 520, the processing circuit 110 may delete the corresponding file in the memory reservation pool, such as the file occupying the partial memory space 122.

In step 530, the processing circuit 110 may trigger the daemon process 110D to perform the synchronization handling to unmap the file.

In step 590, the processing circuit 110 may inform the user of the failure of cancelling the memory reservation. For example, the processing circuit 110 may inform the user by outputting or displaying an error message.

In some embodiments, according to the memory space management list 110D, the processing 110 may monitor the predetermined directory (e.g. the directory "/tmpfs/mpool") to determine whether the file (e.g. the file file1) exists in the predetermined directory, and the processing 110 may selectively map or unmap the file according to the corresponding monitoring result. For example, when the file exists in the predetermined directory, the processing circuit 110 may map the file to the section of virtual memory addresses, and update the file information of the file into the memory space management 110D to dynamically manage the partial memory space 122 (e.g. the partial memory space 122-1). For another example, when the file does not exist in the predetermined directory, the processing circuit 110 may unmap the file from the section of virtual memory addresses, and remove the file information of the file from the memory space management list 110D to dynamically manage the partial memory space 122 (e.g. the partial memory space 122-1). Therefore, the present invention has at least the following advantages:

(1) High flexibility: the user does not have to instruct or set up the size of the memory space needed to be reserved before the server 100 boots up (e.g. before the last time the server 100 shut down), and the reservation operation can be executed any time;

(2) Great performance: the performance of accessing information through memory mapping is almost equivalent to the performance of accessing information in the memory directly;

(3) Easy to use: the server 100 obtains the reserved memory space through memory mapping, and is capable of using the reserved memory space directly; and (4) The result is predictable: the server 100 may learn whether the memory reservation is successful during the reserving stage, and may inform the user of this when needed. For example, if the memory reservation is successful, the user can make sure the usability of the target process; otherwise (e.g. the memory reservation fails), the user can deal with it as early as possible, to prevent the target process from failing to run (e.g. boot up) at some important moment (s), in which severe damage due to the failure may be prevented.

According to some embodiments, the architecture of the server system 10 may vary. For example, the processing circuit 110 may include an Application-Specific Integrated Circuit (ASIC) including one or more sub-circuits corresponding to the method, so as to perform memory space reservation and management for the target process, wherein the HA module 110HA and the VM module 110VM can be the sub-circuits in the ASIC. For another example, any two of the plurality of servers (e.g. the servers 110_1 and 110_2) can communicate with each other through direct connection or through any of other types of connections.

For yet another example, the plurality of servers (e.g. the servers 110_1 and 110_2) can be storage servers or other types of servers. For brevity, similar descriptions for these embodiments are not repeated in detail here.

For better comprehension, the related operations of the HA function and the VM function are mentioned in the above embodiments, but the present invention is not limited thereto. According to some embodiments, the server does not need to be equipped with the HA function and/or the VM function as long as the implementation of the method and the apparatus is not hindered.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing memory space reservation and management, wherein the method is applied to a server system, and the method comprises:
   providing a mount point at a file system of a server in the server system through a predetermined command, and creating a file at the mount point to occupy partial memory space of a physical memory;
   mapping the file to a section of virtual memory addresses to prevent any swap operation from being applied to the partial memory space; and
   updating file information of the file into a memory space management list to dynamically manage the partial memory space.

2. The method of claim 1, wherein the mount point corresponds to a predetermined directory of the file system of the server, and the memory space management list is updated according to at least one monitoring result of the predetermined directory.

3. The method of claim 2, wherein the at least one monitoring result comprises a first monitoring result; and the method further comprises:
   monitoring the predetermined directory to determine whether any file belonging to a predetermined type exists in the predetermined directory, to generate the first monitoring result, wherein the file belongs to the predetermined type; and
   triggering the step of mapping the file to the section of virtual memory addresses when the first monitoring result indicates that the file belonging to the predetermined type exists in the predetermined directory.

4. The method of claim 3, wherein the at least one monitoring result comprises a second monitoring result; and the method further comprises:
   monitoring the predetermined directory to determine whether the file belonging to the predetermined type exists in the predetermined directory, to generate the second monitoring result; and
   when the memory space management list indicates that the file is mapped to the section of virtual memory addresses, and the second monitoring result indicates that the file belonging to the predetermined type does not exist in the predetermined directory, unmapping the file from the section of virtual memory addresses, and removing the file information of the file from the memory space management list, to dynamically manage the partial memory space.

5. The method of claim 2, further comprising:
   according to the memory space management list, monitoring the predetermined directory to determine whether the file exists in the predetermined directory; and
   when the file does not exist in the predetermined directory, unmapping the file from the section of virtual memory addresses, and removing the file information of the file from the memory space management list, to dynamically manage the partial memory space.

6. The method of claim 1, further comprising:
   selecting the file in the virtual memory for a target process according to a characteristic of the target process.

7. The method of claim 1, wherein the file information comprises a file name of the file; and the step of updating the file information of the file into the memory space management list to dynamically manage the partial memory space further comprises:
   updating a set of mapping information corresponding to the file into the memory space management list to dynamically manage the partial memory space, wherein the set of mapping information comprises the file information and the section of virtual memory addresses.

8. The method of claim 7, wherein the file information further comprises a size of the file.

9. The method of claim 1, further comprising:
   when the partial memory space does not need to be used, deleting the file, unmapping the file from the section of virtual memory addresses, and removing the file information of the file from the memory space management list to dynamically manage the partial memory space.

10. The method of claim 1, wherein the server system is equipped with a high availability function; and the method further comprises:
    when the high availability function is enabled, triggering an operation of creating the file at the mount point to occupy the partial memory space, wherein the server is a backup server of the high availability function.

11. The method of claim 1, wherein the server system is equipped with a virtual machine (VM) function, and a VM running on the server system is arranged to control a portion of operations of the server system; and the method further comprises:
    when the VM is created, mapping the file to virtual memory addresses of the VM, wherein the partial memory space is reserved for the VM.

12. The method of claim 11, wherein the server system is equipped with a high availability (HA) function; the server system comprises a plurality of servers, and the plurality of servers comprises the server and another server; and the method further comprises:

when the HA function is enabled, providing a user interface to allow a user of the server system to assign the other server as a start-up server, and assign the server as a backup server, wherein the VM operates in the start-up server when booting up, and the VM operates in the backup server in a backup status.

13. The method of claim 11, wherein another VM running on the server system is arranged to control another portion of operations of the server system; and the method further comprises:

creating another file at the mount point to occupy other partial memory space of the physical memory;

mapping the other file to another section of virtual memory addresses to prevent any swap operation from being applied to the other partial memory space;

updating file information of the other file into the memory space management list to dynamically manage the other partial memory space; and when the other VM is created, mapping the other file to virtual memory addresses of the other VM, wherein the other partial memory space is reserved for the other VM.

14. The method of claim 1, further comprising:

creating another file at the mount point to occupy other partial memory space of the physical memory;

mapping the other file to another section of virtual memory addresses to prevent any swap operation from being applied to the other partial memory space; and updating file information of the other file into the memory space management list to dynamically manage the other partial memory space.

15. An apparatus for performing memory space reservation and management, wherein the apparatus is applied to a server system, and the apparatus comprises:

a processing circuit, positioned within a server of the server system, arranged to control operations of the server system, wherein the processing circuit executes the following operations:

providing a mount point at a file system of the server through a predetermined command, and creating a file at the mount point to occupy partial memory space of a physical memory;

mapping the file to a section of virtual memory addresses to prevent any swap operation from being applied to the partial memory space; and updating file information of the file into a memory space management list to dynamically manage the partial memory space.

16. The apparatus of claim 15, wherein the mount point corresponds to a predetermined directory of the file system of the server, and the memory space management list is updated according to at least one monitoring result of the predetermined directory.

17. The apparatus of claim 16, wherein the at least one monitoring result comprises a first monitoring result; the processing circuit monitors the predetermined directory to determine whether any file belonging to a predetermined type exists in the predetermined directory, to generate the first monitoring result, wherein the file belongs to the predetermined type; and when the first monitoring result indicates that the file belonging to the predetermined type exists in the predetermined directory, the processing circuit triggers an operation of mapping the file to the section of virtual memory addresses.

18. The apparatus of claim 17, wherein the at least one monitoring result comprises a second monitoring result; the processing circuit monitors the predetermined directory to determine whether the file belonging to the predetermined type exists in the predetermined directory, to generate the second monitoring result; and when the memory space management list indicates that the file is mapped to the section of virtual memory addresses, and the second monitoring result indicates that the file belonging to the predetermined type does not exist in the predetermined directory, the processing circuit unmaps the file from the section of virtual memory addresses, and removes the file information of the file from the memory space management list, to dynamically manage the partial memory space.

19. The apparatus of claim 16, wherein according to the memory space management list, the processing circuit monitors the predetermined directory to determine whether the file exists in the predetermined directory; and when the file does not exist in the predetermined directory, the processing circuit unmaps the file from the section of virtual memory addresses, and removes the file information of the file from the memory space management list, to dynamically manage the partial memory space.

20. The apparatus of claim 15, wherein the processing circuit generates a mapping relationship between the file and the section of virtual memory addresses when mapping the file to the section of virtual memory addresses, wherein the mapping relationship allows implementation of accessing the file by accessing the section of virtual memory addresses.

* * * * *